(12) United States Patent
Krawiec

(10) Patent No.: US 11,809,176 B2
(45) Date of Patent: Nov. 7, 2023

(54) FORMATION MANAGEMENT AND GUIDANCE SYSTEM AND METHOD FOR AUTOMATED FORMATION FLIGHT

(71) Applicant: Rockwell Collins, Inc., Cedar Rapids, IA (US)

(72) Inventor: Bryan M. Krawiec, Ashburn, VA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 111 days.

(21) Appl. No.: 17/123,395

(22) Filed: Dec. 16, 2020

(65) Prior Publication Data

US 2022/0187824 A1 Jun. 16, 2022

(51) Int. Cl.
| | | |
|---|---|---|
| *G05D 1/00* | (2006.01) | |
| *G01C 21/20* | (2006.01) | |
| *G05D 1/10* | (2006.01) | |
| *G08G 5/00* | (2006.01) | |

(52) U.S. Cl.
CPC ............ *G05D 1/0027* (2013.01); *G01C 21/20* (2013.01); *G05D 1/0016* (2013.01); *G05D 1/104* (2013.01); *G08G 5/0039* (2013.01)

(58) Field of Classification Search
CPC ...... G05D 1/104; G05D 1/0027; G05D 1/101; G05D 1/0016; G08G 5/0008; G08G 5/0069; G08G 5/0013; G08G 5/0021; G08G 5/0052; G08G 5/0039; G08G 5/0095; B64C 2201/145; B64C 39/024; B64C 2201/143;

(Continued)

(56) References Cited

U.S. PATENT DOCUMENTS

| 6,926,233 B1 | 8/2005 | Corcoran, III |
| 9,643,722 B1 * | 5/2017 | Myslinski .............. H04N 7/183 |
| 10,203,690 B2 | 2/2019 | Harada et al. |

(Continued)

FOREIGN PATENT DOCUMENTS

| CN | 106502266 A | 3/2017 |
| CN | 110865651 A | 3/2020 |

(Continued)

OTHER PUBLICATIONS

Extended Search Report in European Application No. 21215186.4 dated May 20, 2022, 12 pages.

*Primary Examiner* — Kenneth J Malkowski
*Assistant Examiner* — Carville Albert Hollingsworth, IV
(74) *Attorney, Agent, or Firm* — Suiter Swantz pc llo

(57) ABSTRACT

A system for automated formation flight is disclosed. The system may include a formation commander sub-system including a task-based interface configured to receive a sequence of one or more task-based commands along with one or more sets of task-based options for each of the one or more task-based commands from an operator using one or more task-based selectable buttons of the task-based interface. The system may further include a formation manger sub-system communicatively coupled to the formation commander sub-system. Each vehicle of one or more vehicles within one or more teams may be configured to employ the formation manager sub-system. The formation manager sub-system may be configured to receive the one or more task-based commands along with the one or more sets of task-based options for each vehicle to perform.

13 Claims, 8 Drawing Sheets

(58) Field of Classification Search
CPC .......... G01S 1/14; G01S 11/06; G01S 5/0289; G01S 5/14; G01C 21/20
See application file for complete search history.

(56) References Cited

U.S. PATENT DOCUMENTS

| | | |
|---|---|---|
| 2007/0021880 A1* | 1/2007 | Appleby .............. G05D 1/0088 701/23 |
| 2017/0023939 A1 | 1/2017 | Krouse et al. |
| 2017/0045894 A1* | 2/2017 | Canoy .................. G08G 5/0039 |
| 2018/0074520 A1 | 3/2018 | Liu et al. |
| 2018/0231972 A1 | 8/2018 | Woon et al. |
| 2018/0329434 A1 | 11/2018 | Smith et al. |
| 2019/0174149 A1* | 6/2019 | Zhang ................ H04N 21/2393 |
| 2019/0392717 A1 | 12/2019 | Vaughn et al. |
| 2020/0322577 A1 | 10/2020 | Raffa et al. |
| 2022/0035367 A1* | 2/2022 | Ho ....................... G08G 5/0013 |

FOREIGN PATENT DOCUMENTS

| | | |
|---|---|---|
| FR | 2953601 A1 | 6/2011 |
| WO | 2018028358 A1 | 2/2018 |
| WO | 2019041874 A1 | 3/2019 |
| WO | 2020079702 A1 | 4/2020 |

* cited by examiner

FORMATION MANAGEMENT AND GUIDANCE SYSTEM AND METHOD FOR AUTOMATED FORMATION FLIGHT

BACKGROUND

Flight control systems are used to control aerial vehicles. The command and control interfaces used in such flight control systems often necessitate a 1-to-1 relationship between the aerial vehicle and the operator. This is insufficient for scenarios where operators are expected to command and control one or more teams of vehicles simultaneously.

SUMMARY

A system for automated formation flight is disclosed, in accordance with one or more embodiments of the disclosure. In one embodiment, the system may include a formation commander sub-system including a task-based interface configured to receive a sequence of one or more task-based commands along with one or more sets of task-based options for each of the one or more task-based commands from an operator using one or more task-based selectable buttons of the task-based interface. In another embodiment, the system may include a formation manger sub-system communicatively coupled to the formation commander sub-system, each vehicle of one or more vehicles within one or more teams configured to employ the formation manager sub-system. In another embodiment, the formation manager sub-systems being configured to: receive the sequence of one or more task-based commands along with the one or more sets of task-based options from the formation commander sub-system; receive one or more incoming peer-to-peer messages from each vehicle of the one or more vehicles within the one or more teams; receive one or more sets of navigation data from a navigation system; receive one or more sets of additional data from at least one of one or more mission-relevant or one or more task-relevant sub-systems; generate one or more status outputs based on at least one of the one or more task-based commands, the one or more sets of task-based options, the one or more incoming peer-to-peer messages, the one or more sets of navigation data, or the one or more sets of additional data; provide the generated one or more status outputs to the formation commander sub-system; generate one or more outgoing peer-to-peer messages based on at least one of the one or more task-based commands, the one or more sets of task-based options, the one or more incoming peer-to-peer messages, the one or more sets of navigation data, or the one or more sets of additional data; provide the generated one or more outgoing peer-to-peer messages to each vehicle within the one or more vehicles of the one or more teams; and generate one or more guidance and control inputs for a formation guidance sub-system based on at least one of the one or more task-based commands, the one or more sets of task-based options, the one or more incoming peer-to-peer messages, the one or more sets of navigation data, or the one or more sets of additional data. In another embodiment, the formation commander sub-system being configured to dynamically adjust the task-based interface based on the provided one or more status outputs from the formation manager sub-system.

In some embodiments, the formation guidance sub-system may be configured to: decompose the generated one or more guidance and control inputs; and generate one or more autopilot commands based on the one or more decomposed guidance and control inputs.

In some embodiments, the generated one or more guidance and control inputs may include one or more trajectories for the one or more vehicles to follow.

In some embodiments, the generated one or more guidance and control inputs may include one or more offsets relative to one or more targets for the one or more vehicles to maintain.

In some embodiments, the formation commander sub-system may be configured to display the generated one or more status outputs provided by the formation manager sub-systems on the task-based interface.

In some embodiments, the formation manager sub-system may be configured to: receive a set of formation roster data indicating team composition and characteristics of the one or more teams; generate one or more status outputs based on at least one of the one or more task-based commands, the one or more sets of task-based options, the one or more incoming peer-to-peer messages, the one or more sets of navigation data, or the one or more sets of additional data, or the set of formation roster data; generate one or more outgoing peer-to-peer messages based on at least one of the one or more task-based commands, the one or more sets of task-based options, the one or more incoming peer-to-peer messages, the one or more sets of navigation data, or the one or more sets of additional data, or the set of formation roster data; and generate one or more guidance and control inputs for a formation guidance sub-system based on at least one of the one or more task-based commands, the one or more sets of task-based options, the one or more incoming peer-to-peer messages, the one or more sets of navigation data, or the one or more sets of additional data, or the set of formation roster data.

In some embodiments, the formation manager sub-system may be configured to: generate a set of modified formation roster data; provide the set of modified formation roster data to each vehicle of the one or more vehicles within the one or more teams, the set of modified roster data provided as one or more outgoing peer-to-peer messages; receive the set of modified formation roster data as one or more incoming peer-to-peer messages; update the set of formation roster data with the set of modified formation roster data; and provide the set of modified formation roster data to the formation commander sub-system, the set of modified formation data provided as one or more status outputs.

In some embodiments, the formation manager sub-system may be configured to automatically execute one or more emergency actions when an emergency event occurs.

In some embodiments, the at least one of the one or more mission-relevant sub-systems or the one or more task-relevant sub-systems may include at least one of: one or more payload sub-systems, one or more radios, one or more tactical sensors, or one or more cameras.

In some embodiments, the operator may include at least one of: a human, executing software logic, or an artificially intelligent agent (AI).

In some embodiments, the one or more task-selectable buttons may be organized into one or more categorized groupings including at least one of: individual out-of-formation tasks, leader-follower formation tasks, leaderless cooperative tasks, in-formation side tasks, or multi-formation coordinating tasks.

A method for automation formation flight is disclosed, in accordance with one or more embodiments of the disclosure. In one embodiment, the method includes, but is not limited to, receiving a sequence of one or more task-based commands from an operator using one or more task-based selectable buttons of a task-based interface of a formation commander sub-system. In another embodiment, the method includes, but is not limited to, receiving one or more sets of task-based options for each task-based command of the one or more task-based commands using one or more task-based options selectable buttons of the task-based interface of the formation commander sub-system. In another embodiment, the method includes, but is not limited to, providing the sequence of one or more task-based commands along with the one or more sets of task-based options to one or more formation manager sub-systems, each formation manager sub-system of the one or more formation manager sub-systems employed on a vehicle in one or more teams of one or more vehicles. In another embodiment, the method includes, but is not limited to, receiving one or more incoming peer-to-peer messages from each formation manager sub-system of the one or more formation manager sub-systems employed on a vehicle of the on the one or more teams of one or more vehicles. In another embodiment, the method includes, but is not limited to, receiving one or more sets of navigation data from a navigation system. In another embodiment, the method includes, but is not limited to, receiving one or more sets of additional data from at least one of a mission-relevant sub-system or a task-relevant sub-system. In another embodiment, the method includes, but is not limited to, generating one or more status outputs based on at least one of the one or more task-based commands, the one or more sets of task-based options, the received one or more incoming peer-to-peer messages, the one or more sets of navigation data, or the received one or more sets of additional data. In another embodiment, the method includes, but is not limited to, providing the generated one or more status outputs to the formation commander sub-system. In another embodiment, the method includes, but is not limited to, generating one or more outgoing peer-to-peer messages based on at least one of the one or more task-based commands, the one or more sets of task-based options, the one or more incoming peer-to-peer messages, the one or more sets of navigation data, or the one or more sets of additional data. In another embodiment, the method includes, but is not limited to, providing the generated one or more outgoing peer-to-peer messages to each formation manager sub-system of the one or more formation manager sub-systems employed on a vehicle of the one or more teams of the one or more vehicles. In another embodiment, the method includes, but is not limited to, generating one or more guidance and control inputs for a formation guidance sub-system based on at least one of the one or more task-based commands, the one or more sets of task-based options, the one or more incoming peer-to-peer messages, the one or more sets of navigation data, or the one or more sets of additional data.

In some embodiments, the method may include, but is not limited to, decomposing the generated one or more guidance and control inputs. In some embodiments, the method may include, but is not limited to, generating one or more autopilot commands based on the one or more decomposed guidance and control inputs.

In some embodiments, the method may include, but is not limited to, validating the sequence of one or more task-based commands. In some embodiments, the method may include, but is not limited to, assigning the sequence of one or more task-based commands to the one or more formation manager sub-systems. In some embodiments, the method may include, but is not limited to, performing the assigned sequence of one or more task-based commands. In some embodiments, the method may include, but is not limited to, monitoring the performance of the assigned sequence of one or more task-based commands through the one or more incoming peer-to-peer messages and the one or more outgoing peer-to-peer messages.

In some embodiments, the method may include, but is not limited to, automatically executing one or more emergency actions when an emergency event occurs.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1:
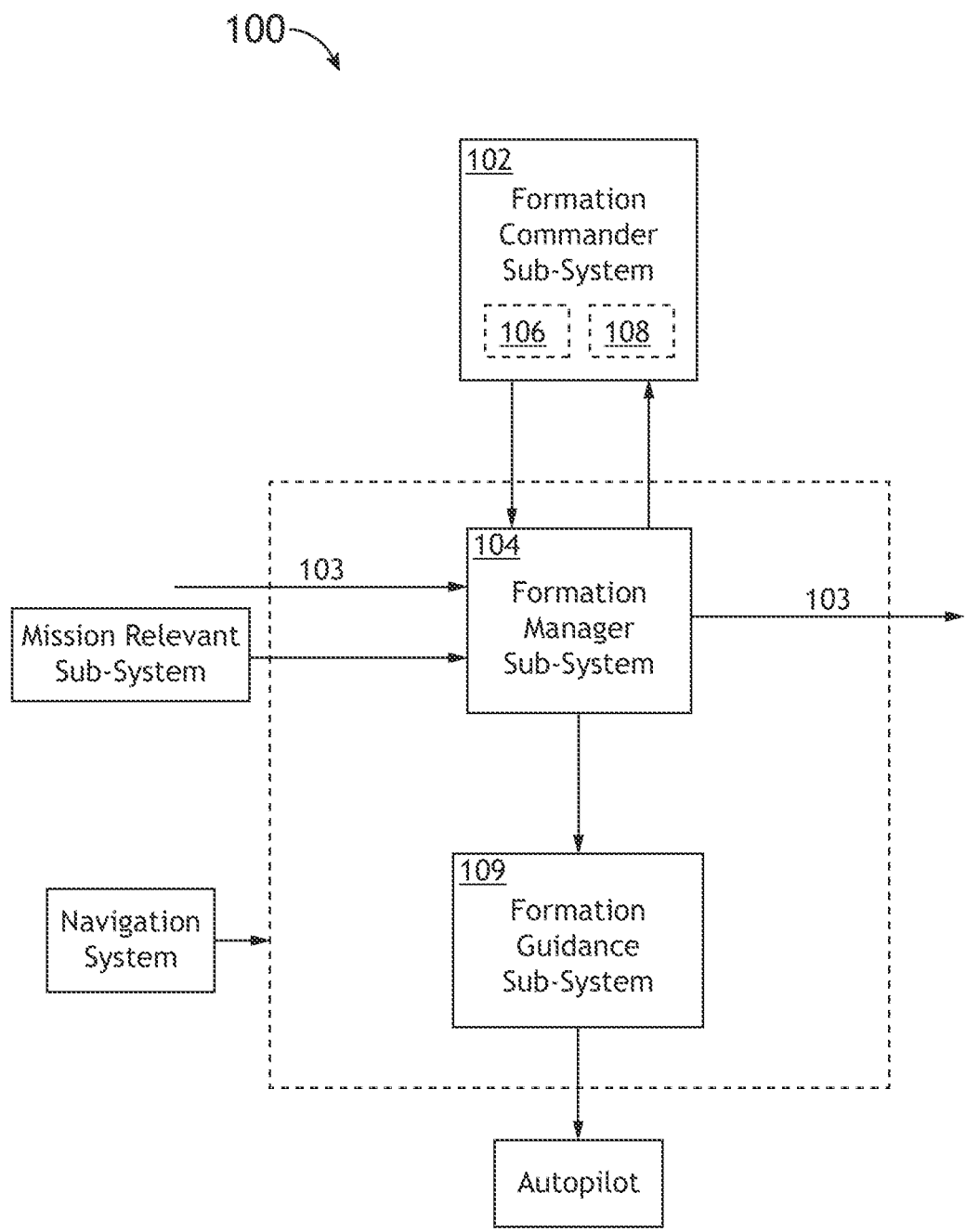
FIG. 1 illustrates a simplified block diagram of a flight processing architecture including a formation management and guidance system, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

FIGS. 1-7 generally illustrate a formation management and guidance system and method for automated precision formation flight, in accordance with one or more embodiments of the disclosure.

Classic automatic flight control systems and integrated avionics solutions are well equipped with single aircraft path definition, guidance, and control functions for maneuvering in absolute space. In commercial avionics, Flight Management Systems (FMS) provide path/route geometry definitions for the aircraft to follow and equipment like Flight Directors (FD) and Flight Control Computers (FCC) provide outer and inner loop aircraft control. The result is a solution that allows a pilot or operator to command a single aircraft along fixed absolute paths in 3-dimensional space. Similar functionality exists for unmanned aerial vehicles (UAVs) but the functionality may be hosted in either a single monolithic flight control computer or another federated arrangement of line replaceable units (LRUs).

This level of command and control capability often necessitates a 1-to-1 relationship between an aerial asset (piloted aircraft, unmanned aerial vehicle (UAV), or optionally-piloted vehicle (OPV)) and an operator since the workload required to simultaneously manage and maneuver multiple assets would be unreasonable to expect for a single operator given the aforementioned interfaces and automation capabilities. In the military space, this state of affairs is wholly insufficient for advanced future CONOPS where command and control of teams of assets is expected to be pervasive. In these future scenarios, the paradigm is for humans to act in more of a supervisorial ("on-the-loop") capacity than ever before. In the commercial space, automation developments are consistently seeking pilot workload reduction and given recent interest in commercial formation flight operations, the need for automation capabilities and user interfaces for multi-vehicle command and control is similarly becoming clear.

Embodiments of the present disclosure are directed to a system and method for automated formation flight that includes a task based user interface for control and monitoring of multi-vehicle teams. Further, embodiments of the present disclosure are directed to a system and method for automated formation flight including a formation management sub-system and formation guidance sub-system that integrates with autopilot avionics on each cooperating aerial platform.

FIGS. 1-6 in general illustrate a formation management and guidance system 100, in accordance with one or more embodiments of the disclosure.

FIG. 1—System Overview

Referring to FIG. 1, the system 100 for automated formation flight may include, but is not limited to, a formation manager sub-system 104, a formation guidance sub-system 109, and the like. The formation manager sub-system 104 may be configured to perform computations and communications relating to the management of a multi-vehicle team. The formation guidance sub-system 109 may be configured to execute one or more guidance and control laws that maneuver the aerial vehicle.

The formation manager sub-system 104 may be communicatively coupled to a formation commander sub-system 102 configured to task a single vehicle or a multi-vehicle team. The formation commander sub-system 102 may include a formation commander/operator (e.g., human, artificial intelligent agent, or higher level decision making software). The formation commander sub-system 102 may further include one or more interface elements (e.g., human-machine interface (HMI), artificial pilot machine interface (APMI), or the like).

The formation manager sub-system 104 may be configured to receive task or tactic based commands from the formation commander sub-system 102. The formation manager sub-system 104 may be further configured to provide status outputs to the formation commander sub-system 102. The one or more status outputs may include the state of a single vehicle or one or more multi-vehicle teams. For example, the status outputs may include, but are not required to include, task status, vehicle health, network/communication status, and the like.

Figure 5:
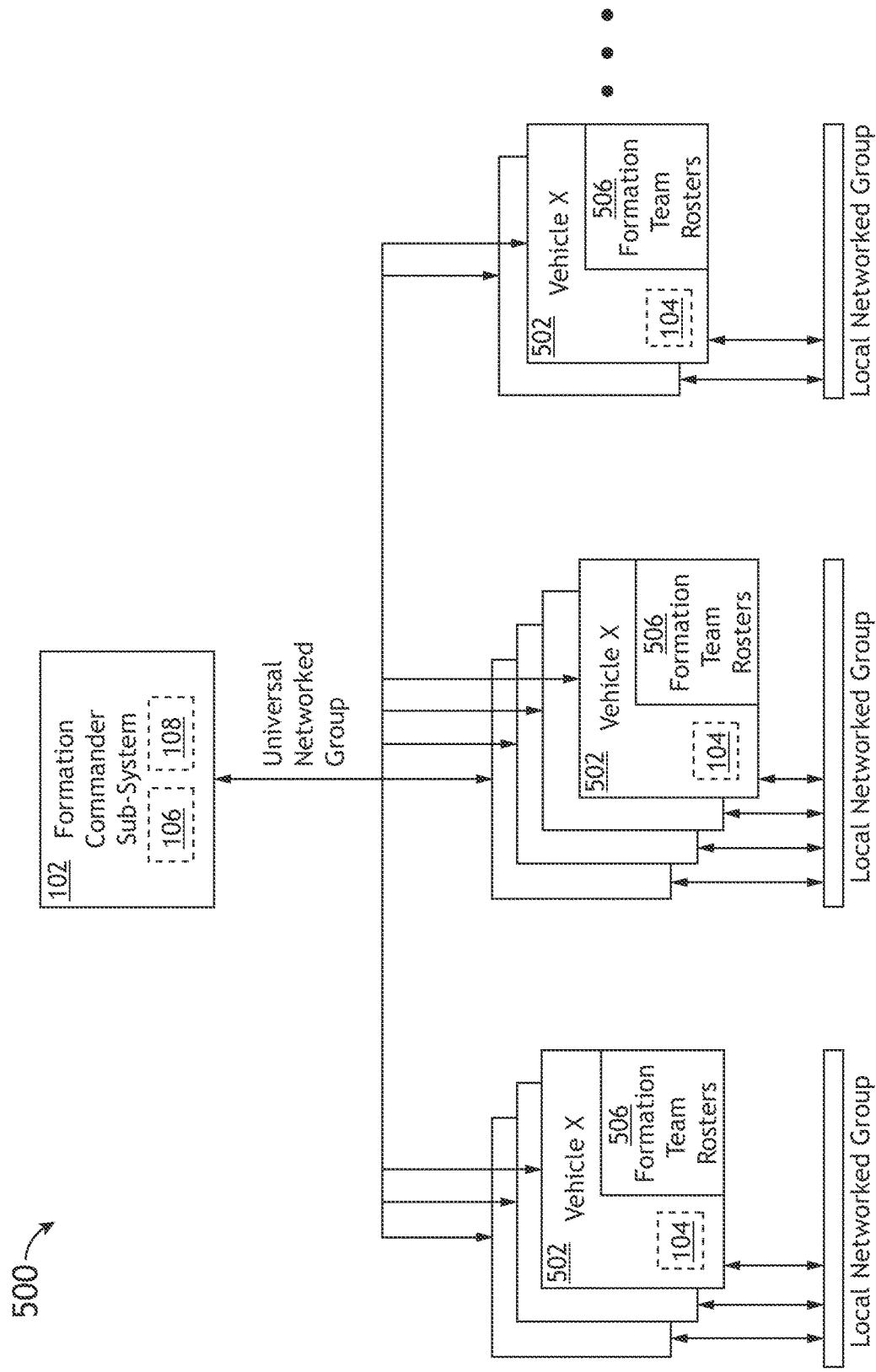
FIG. 5 illustrates a simplified block diagram of a formation communication architecture for the formation management and guidance system, in accordance with one or more embodiments of the disclosure.

The formation manager sub-system 104 may be further configured to send and/or receive one or more peer-to-peer messages 103. The one or more peer-to-peer messages 103 may be received over a local network between team members (as shown in FIG. 5). The formation manager sub-system 104 may be configured to parse and decompose the incoming peer-to-peer data and perform a variety of functions including, but not limited to, formation health management functionality, raise any necessary alerts, and performing task specific monitoring and behaviors. Further, the formation manager sub-system 104 may be configured to generate and send peer-to-peer data. The content of such data may include, but is not limited to, alerts, navigation data, commands provided by members in the formation with higher levels of authority to members in the formation with lower levels of authority (e.g., a team lead to another team member), and data for cooperation or negotiation amongst team members.

The formation management sub-system 104 may be further configured to generate one or more guidance and control inputs for the formation guidance sub-system 109. The one or more guidance and control inputs may include, but are not required to include, trajectories to track, targets to pursue, cooperative aircraft to follow, and the like.

The formation guidance sub-system 109 may be configured to dynamically generate one or more autopilot commands. The one or more autopilot commands may include, but are not required to include, airspeed, angle bank, vertical speed, acceleration vectors, and the like. The autopilot commands produced by the formation guidance sub-system 109 may be configured to interface with a flight control computer, flight director, or other vehicle flight control system that hosts one or more selectable autopilot modes.

It is noted herein that the system 100 may be configured to operate with numerous classes of aerial vehicles including, but not limited to, one or more fixed-wing aircraft, one or more rotary-wing aircraft (e.g., helicopters), one or more multi-rotor aircraft (e.g., quadcopters), and the like. Further, the system 100 may be configured to operate in both homogeneous (e.g., all teams consisting of the same vehicle type) and heterogeneous vehicle arrangements (e.g., mixed teams with combinations of vehicles (one or more helicopters, one or more fixed-wing aircraft, or the like)).

The system 100 may be further configured to receive navigation data from a navigation sub-system. For example, the navigation data may include, but is not limited to, ownship navigation data e.g., ownship pose, velocity, orientation, angular rate, and the like). By way of another example, the navigation data may include relative navigation data including, but not limited to, navigation data of other vehicles in the multi-vehicle team, relative navigation data of other vehicles in the multi-vehicle team with respect to the ownship vehicle, or relative navigation data of other vehicles in the multi-vehicle team with respect to each other. Further, the navigation data may also include, but is not limited to, data for relative precision timing for time synchronization of the teaming vehicles.

The system 100 may also be configured to receive data from mission relevant sub-systems on-board the vehicle. For example, the system 100 may receive data from, but is not required to receive data from, one or more payloads, one or more radios, one or more tactical sensors, one or more cameras, and the like.

Each vehicle within a team of vehicles may include identical sub-systems configured to perform automated formation flight operations. For example, each vehicle within a team of vehicles may include a formation manger sub-system 104 that is substantially similar to a formation manager sub-system 104 of another team member. By way of another example, each vehicle within a team of vehicles may include a formation guidance sub-system 109 that is substantially similar to a formation guidance sub-system 109 of another team member. It is noted herein that this identical sub-system structure is key to scalability, verifiability, and overall system predictability, and reduces the likelihood of undesirable emergency system level behaviors.

Figure 2:
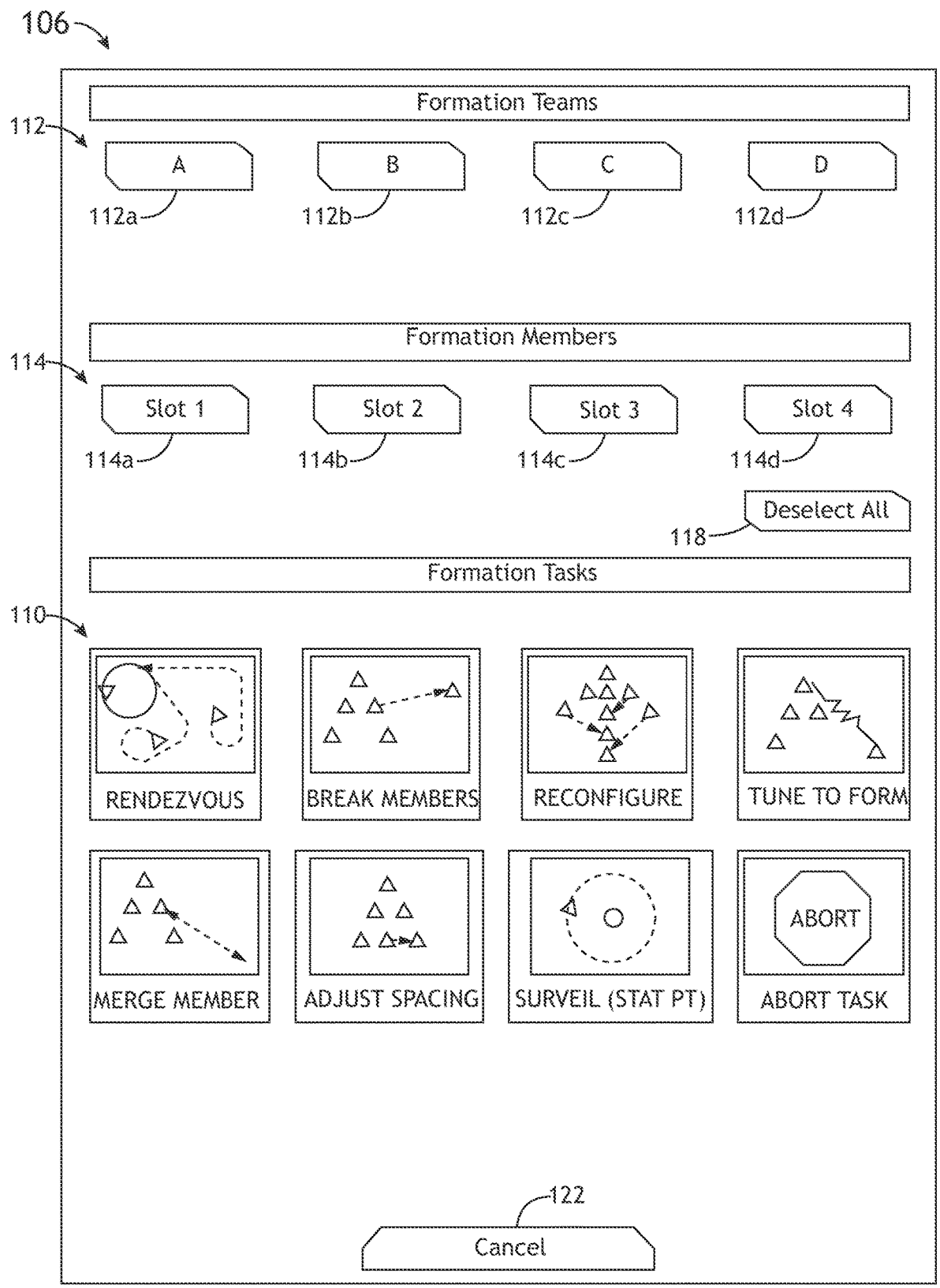
FIG. 2 illustrates a simplified schematic of an example task-based interface of the formation management and guidance system, in accordance with one or more embodiments of the disclosure.

FIG. 2—Formation Commander Sub-System Details

FIG. 2 illustrates a simplified schematic of an example task-based interface 106 for the formation commander sub-system 102, in accordance with one or more embodiments of the disclosure. Although FIG. 2 depicts a collection of selectable buttons akin to a human-machine interface (HMI), it is noted herein that the task-based interface 106 may include any type of interface known in the art including, but not limited to, an HMI, an artificial pilot machine interface (APMI), a software defined application programming interface (API), and the like.

The formation commander sub-system 102 may include a task-based interface 106 configured to receive one or more inputs from an operator 108 (e.g., a formation commander). The task-based interface 106 may include one or more sets of one or more buttons (or interface elements). The one or more buttons (or elements) may include one or more selectable buttons, such that an operator 108 is able to interact with the task-based interface 106 using the one or more selectable buttons (or interface elements). As discussed further herein, in some embodiments, the one or more buttons are not selectable, such that an operator is not able to select the one or more buttons to interact with the task-based interface. In this regard, the one or more sets of one or more buttons are dynamically changing based on one or more characteristics of the system.

The task-based interface 106 may include a set of task-based selectable buttons 110. For example, the task-based interface 106 may include a set of task-based selectable buttons 110 associated with one or more tasks to be performed by one or more aerial vehicles.

The set of commandable tasks 110 may include one or more primitive actions for a single vehicle or a team of vehicles to perform. The one or more primitive actions may be configured to represent one or more tactics that a single vehicle or a team of vehicles may be configured to perform. The one or more tasks 110 may be configured to be sequenced in time to orchestrate a complex mission objective. In this regard, a complex mission may be orchestrated by sequencing tasks 110 together in a logical manner. By way of a non-limiting example, a set of vehicles may be tasked to Rendezvous or join with a lead vehicle to build a vehicle formation. Once complete, the formation may be tasked to Reconfigure or change the formations geometry/spacing. Further, at some later point in a mission, a single vehicle can be tasked to leave the formation (Break Members), and then asked to Surveil a point of interest for a specified amount of time. Later, once the surveillance is complete, the vehicle can be tasked to Merge back into the existing formation, and the further sets of tasks can be sequenced accordingly. It is noted herein, that modularizing formation flight and single or multi-vehicle teaming behaviors into simple, intuitive, atomic tactics is key to both the system's predictability/verifiability and also to its maturation (through expansion of tactics). Furthermore, this set of tasks 110 serves as an action space for single or multi-vehicle teams to employ when being commanded either by the operator (e.g., a human operator, artificially intelligent agent, or the like).

The set of task-based selectable buttons 110 may be organized into one or more thematic groupings. For example, the set of task-based selectable buttons 110 may be broken down based on the type of task to be performed. For instance, the set of task-based selectable buttons 110 may be organized based on whether it is a formation building task, formation splitting task, or the like. By way of another example, the set of task-based selectable buttons 110 may be organized based on source of control. For instance, the set of task-based selectable buttons 110 may be organized based on whether it is a leader orchestrated task, an individual orchestrated task, an automatic task, or the like. It is noted herein that while FIG. 2 depicts a select number of task-based selectable buttons 110, the task-based interface 106 may include any number of task-based selectable buttons 110.

The set of task-based selectable buttons 110 may be dynamically available based on the current status of the one or more members of a vehicle team. For example, if a task cannot be performed given the status of the one or multiple members, the task-based button associated with that task may not be selectable (e.g., an operator cannot select that specific task button). For instance, a formation geometry change (e.g., reconfiguration) cannot be executed if the team has not joined up (e.g., rendezvous or merge), so the task-based interface 106 may be configured to adjust the set of task-based selectable buttons 110 to reflect this (e.g., the formation geometry change buttons would not be selectable).

The set of selectable buttons may further include a set of team selectable buttons 112. For example, the task-based interface 106 may include set of team selectable buttons 112 associated with one or more aerial vehicle teams. For instance, as shown in FIG. 2, the set of selectable buttons 112 may include a first selectable button 112a associated with a first team (e.g., Team A), a second selectable button 112b associated with a second team (e.g., Team B), a third selectable button 112c associated with a third team (e.g., Team C), and a fourth selectable button 112d associated with a fourth team (e.g., Team D). It is noted herein that although FIG. 2 depicts Teams A-D, it is noted herein that the task-based interface 106 may include any number of teams.

The set of selectable buttons may further include a set of member selectable buttons 114. For example, the task-based interface 106 may include a set of member selectable buttons 114 associated with the one or more members of the aerial vehicle teams. For instance, as shown in FIG. 2, the set of selectable buttons 114 may include a first selectable button 114a associated with a first member (e.g., slot 1), a second selectable button 114b associated with a second member (e.g., slot 2), a third selectable button 114c associated with a third member (e.g., slot 3), and a fourth selectable button 114d associated with a fourth member (e.g., slot 4). The set of selectable buttons 114 associated with the one or more members may be dynamically available based on the selected team button 112 in the formation teams portion of the interface 106. For example, in a non-limiting example, if the operator selects Team A and Team A only has three members, the fourth button 114d (e.g., slot 4) may not be selectable. In this regard, the fourth button 114d (e.g., slot 4) may be a different color than the other buttons 114a-114c (e.g., the button 114d may be grey). It is noted herein that although FIG. 2 depicts slots 1-4, it is noted herein that the task-based interface 106 may include any number of members 114 (e.g., Slots 1-N).

The task-based interface 106 may include one or more additional buttons. By way of another example, the task-based interface 106 may include one or more deselect 118 buttons configured to un-select an operator selection. In one instance, if an operator 108 selects the deselect button 118 in the formation team portion of the interface 106, the buttons 114 that the operator 108 had previously selected would be un-selected, such that the operator 108 may be configured to make additional team selections.

By way of another example, the task-based interface 106 may include one or more cancel buttons 122 configured to minimize the interface 106. In this regard, the cancel button 122 may be configured to cancel any selections made on the task-based interface 106, such that the formation manager sub-system 104 does not receive the one or more operator selections previously selected using the interface 106.

The operator 108 (e.g., formation commander) may be configured to interact with the one or more selectable buttons of the task-based interface 106. For example, an operator 108 (e.g., formation commander) may select a team of aerial vehicles in which the operator wants to perform a mission objective using the team selection set of buttons 112. The operator may then select which members of the selected team the operator wants to perform the mission objective using the member selection set of buttons 114. The operator may then select a sequence of one or more task-based buttons 110 that the operator 108 wants the selected members to perform to achieve the mission objective. For instance, the operator may select members 1-3 (e.g., slot 1, slot 2, and slot 3) of Team A to perform rendezvous using the one or more selectable buttons 110, 112, 114. As another example, the operator may select members 2 and 7 (e.g., slot 2 and slot 3) of Team C to break from (depart) the formation using the one or more selectable buttons 110, 112, 114.

The operator 108 may include any operator 108 including, but not limited to, a human operator, artificial intelligence operator, or the like. For example, where the operator is an artificial intelligence operator, the one or more tasks selections may be performed automatically using artificial intelligence models. In this regard, the allowable tasks would be configured to form a reasonable action space for the artificial intelligence operator to be trained. The task-based interface 106 may include any task-based interface including, but not limited to, a human/machine interface (HMI), artificial pilot machine interface (APMI), or the like. It is noted herein that the task-based interface 106 is configured to give the operator the ability to manage several vehicle teams simultaneously.

Figure 3:
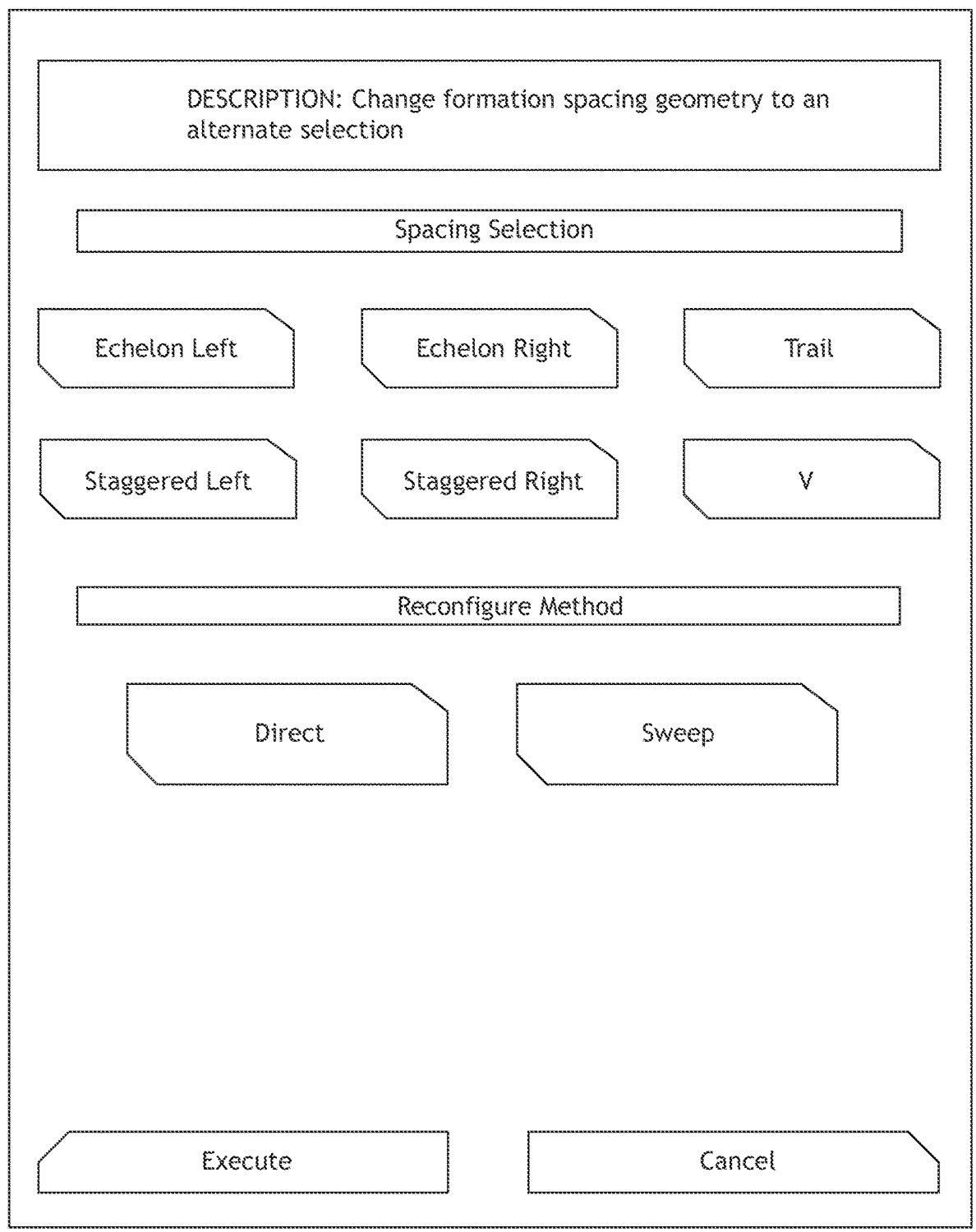
FIG. 3 illustrates a simplified schematic of an example task-based interface including an options window, in accordance with one or more embodiments of the disclosure.

FIG. 3—Options Window

FIG. 3 illustrates a simplified schematic of an example task-based interface 106 including an options window 300, in accordance with one or more embodiments of the disclosure.

The task-based interface 106 may further include options windows 300. The options windows 300 may specify one or more options available for a selected task. As such, different options windows may be available for different selected tasks 110 to allow the operator to configure one or more aspects of the selected tasks. For example, the options window 300 may be configured to allow an operator 108 (e.g., formation commander) to specify one or more options for the selected task selected using the selectable buttons 110. For instance, in the example depicted, the operator may have selected a Reconfigure task 110. The options window 300 may be displayed and the operator 108 may specify one or more spacing options for the formation reconfiguration and a maneuvering method for performing the reconfiguration. The one or more spacing options may include, but are not limited to, echelon left, echelon right, trail, staggered left, staggered right, and V. It is noted herein that although FIG. 3 illustrates a specific set of options, the options window 300 may include any number and type of option for that specific selected task.

Once the options have been selected, the operator may select to Execute the task in which case all of the selections made in the task-based interface 106 and a corresponding options window 300 may be communicated to the formation manager sub-systems 104 on one or multiple vehicles. Further, the options window 300 may include additional buttons including, but not limited to, a cancel button configured to minimize the options window 300 and return the operator to the task-based interface 106.

Figure 4:
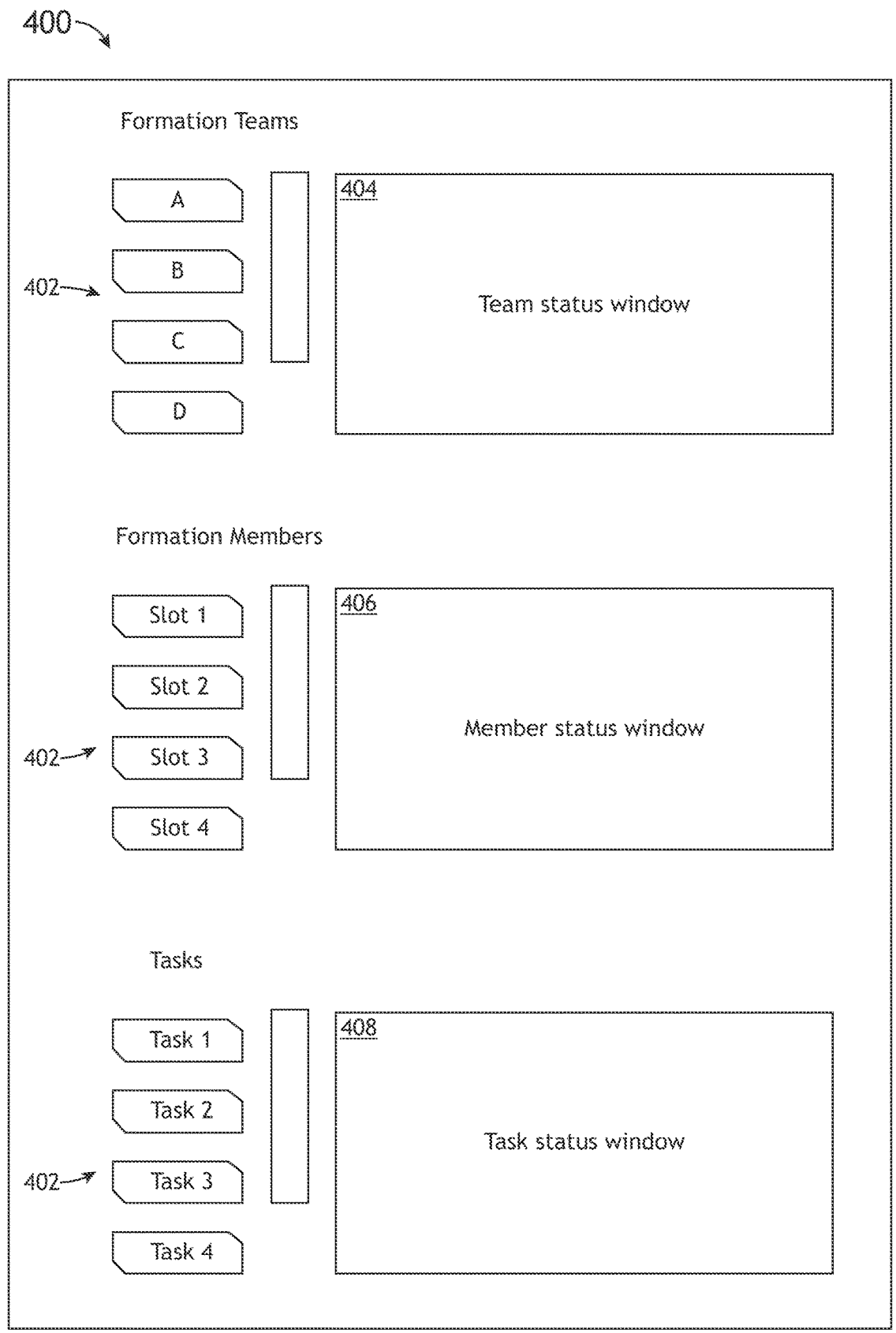
FIG. 4 illustrates a simplified schematic of an example task-based interface including a status window, in accordance with one or more embodiments of the disclosure.

FIG. 4—Status Window

FIG. 4 illustrates a simplified schematic of an example task-based interface 106 including a status window 400, in accordance with one or more embodiments of the disclosure.

The task-based interface 106 may include a status window 400 configured to display real-time information communicated from the teams. For example, the formation manager sub-system 104 may be configured to provide a set of vehicle status outputs (e.g., real time information) to the formation commander sub-system 102, such that the status window 400 may be configured to display the real time information. In this regard, the operator 108 may be configured to utilize the information displayed on the status window 400 when making decisions about current or future missions.

The status window 400 may include one or more selectable buttons 402, such that an operator can toggle between the one or more selectable buttons to display real-time information associated with different teams and different members on the different teams. For example, the status window 400 may include a team status window 404 including real-time team status information. The team real-time information may include formation status including, but not limited to, formation ID, predicted and reported number of members in the formation, task status (e.g., issued, aborted, completed), behavior state of formation lead, formation type (e.g., echelon right), and the like. By way of another example, the status window 400 may include a member status window 406 including real-time member information. The real-time member information may further include individual statuses including, but not limited to, member unique ID number, formation ID, task status, behavior state of the member, formation type, relative offsets that team members are flying relative to a flight lead or a virtual formation reference point, and the like.

By way of another example, the status window 400 may include a task status window 408 including real-time task information. The real-time information may further include status metrics catered to the tasks themselves that provide information regarding task progress, completion metrics, or the like (e.g., if the task involves surveillance of a target, target location error, last confirmed sighting time, and on the like may be displayed; if the task involves mapping or reconnaissance of an area, percentage of area scanned, threats detected, and the like may be displayed), and the like.

The status window 400 may include one or more additional selectable buttons. It is noted herein that although FIG. 4 illustrates button selections for Formation Teams A-D are displayed and Formation Members for each team slots 1-4, the status window 400 may include one or more additional selectable elements for an arbitrary number of Formation Teams and Formation Members for each team.

FIG. 5—Formation Communication Architecture

FIG. 5 illustrates a simplified block diagram of a formation communication architecture 500 of the system 100, in accordance with one or more embodiments of the disclosure.

The formation commander sub-system 102 may be configured to provide one or more formation team rosters 506 to the one or more aerial vehicles. For example, the task-based interface 106 may be configured to send the one or more formation team rosters 506 to the one or more aerial vehicles 502 via a universal networked group (e.g., multicast, or the like). The one or more formation team rosters may include a set of data that describes essential elements of the each allowable team's construction. For example, each of the one or more formation team rosters 506 may be configured to describe essential elements of each of the one or more formation teams. In this regard, the task-based interface 106 may be configured to compose and send formation team roster data 506 to the vehicles 502 when dynamically changing the selectable buttons 110, 112, 114 of the task-based interface, as discussed previously herein.

The set of formation roster data 506 may include important information about the vehicles 502 (e.g., the formation teams). For example, the roster may include which vehicles are part of which teams. For instance, the task-based interface 106 is configured to send such data and utilize such data when displaying the one or more team selection buttons 112. By way of another example, the roster may include which vehicles are designated flight leads. By way of another example, the roster may include permissible formation geometries. For instance, the task-based interface 106 is configured to send such data and utilize such data when displaying the one or more task selection buttons 110. By way of another example, the roster may include agreed upon contingency actions.

It is noted herein that the formation team roster data 506 may include any data related to the composition, capabilities, limitations, and the like that is necessary to configure a vehicle 502 as part of a formation team. In this regard, the formation manager sub-system 104 may be configured to dynamically utilize data from the formation team rosters 506 in performing its functions (e.g., managing networks and data transmission between teamed vehicles; managing, performing, and monitoring teammates during tasks subject to commands received by the formation commander sub-system 102; performing automatic emergency actions; and the like).

The formation team rosters 506 may be configured to be loaded/programmed during pre-flight configuration, such that each vehicle 502 has identical roster information. The rosters may be further configured to be updated/modified during flight to modify team compositions, capabilities, limitations, automatic emergency actions, and so on. This can be done either through commands issued by the formation commander sub-system 102 through the interface 106 or alternatively, through autonomous negotiation amongst the vehicles 502 (utilizing functionality of the sub-system 104) so long as consistency is ensured amongst rosters among all vehicles 502 in a team (e.g., Team A, Team B, and the like) during flight.

The formation commander sub-system 102 may be further configured to receive updated formation team rosters 506 if they have been modified by the vehicles 502 during flight.

Each individual vehicle 502 may be configured to communicate with other vehicles in the team using locally networked peer-to-peer groups (one group per team; e.g., multicast, or similar). It is noted herein the use of the local network eliminates unnecessary cross talk traffic between formation teams and also provides communications resilience to the overall design since it is likely that peers within the same team will be reasonably collocated and hence have stronger communications links with each other. In the event of a total communication denial, local formation members may be configured to perform automatic emergency actions until the situation is resolved, as discussed further herein. Further, due to the nature of the task-based interface 106, communication with the formation commander sub-system 102 may be intermittent or lost at points in an operation. In such an event, the formation teams may continue their current tasking, or perform alternative actions through negotiation amongst the vehicles 502 within a formation team or negotiation amongst multiple teams. This latter negotiation may be most relevant, for example, in instances where instance multiple teams are cooperating on a task involving multiple teams or are otherwise reasonably co-located.

Formation teams may further be configured to communicate with other formation teams using the depicted universal networked group in FIG. 5 to exchange data necessary for cross formation team coordination.

Although FIG. 5 illustrates a specific number of vehicles 502 organized into a specific number of formation teams, it is noted herein that the system 100 may include any number of vehicles and any number of vehicle teams. Further, it is noted herein that the system 100 may include any type of aerial vehicle known in the art including, but not limited to, unmanned aerial vehicles (UAVs), manned aerial vehicles, and the like.

Further, it is noted herein that the vehicle 502 may be a member of single team or multiple teams. For example, each vehicle 502 may be present in one or more formation team rosters 506 and may be able to join one or multiple formation teams. In a non-limiting example, a vehicle 502 may be defined as slot 3 in a formation team roster 506 that defines formation team A, slot 5 in a formation team roster that defines team C, slot 1 in a formation team roster that defines team E, and so on. In this example, the vehicle 502 may be configured to perform tasks with team A during one timespan in an operation, then leave team A to join and perform tasks with team E during another timespan. This switching between teams may continue dynamically subject to the commands from the operator 108 through the interface 106 and/or through autonomous negotiation amongst team members or teams.

Figure 6:
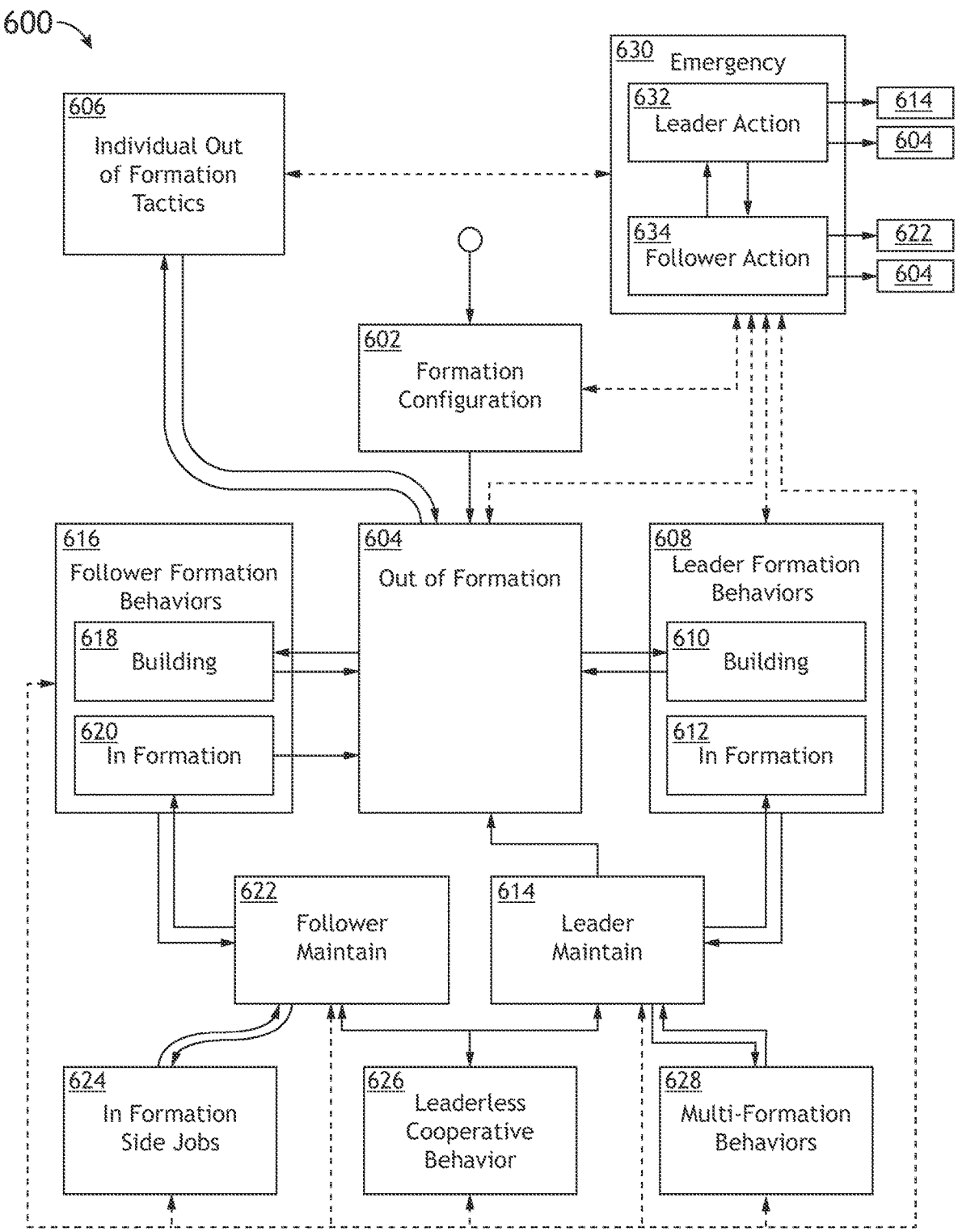
FIG. 6 illustrates a simplified flow diagram of a method of process for the formation management sub-system, in accordance with one or more embodiments of the disclosure.

FIGS. 6/7—Method Overview

FIG. 6 illustrates a simplified flow diagram of a method of process 600 for the formation management sub-system 104, in accordance with one or more embodiments of the disclosure.

Once the tasks and their desired options have been selected, the selected sequence of tasks and the respective options selected by the operator 108 may be configured to be transmitted to all vehicles 502 in communication with the operator 108, as shown in FIG. 5. For example, the formation manager sub-system 104 of each vehicle 502 may configured to receive the one or more operator selections (e.g., task commands). For instance, the formation manager sub-system 104 may be configured to receive a set selections including a set of teams to perform one or more selected tasks (selected using the team selection buttons 112), a set of members within the selected teams to perform one or more selected tasks (selected using the member selection buttons 114), and the selected one or more tasks themselves (selected using the task-based buttons 110) along with any respective selected options for those tasks (selected using the options window 300). Such selections received by the formation manager sub-system 104 may be updated sequentially in time as new selections are provided by the operator 108.

The one or more task commands may be configured to be sent to the formation manger sub-system 104 asynchronously and require low bandwidth. It is noted herein that this is desirable in formation flight or aerial teaming systems when communication may be contested or denied for portions of a mission.

The formation manager sub-system 104 may be configured to parse and decompose the incoming task commands from the formation commander sub-system 102 and perform a plurality of functions related to performing the incoming task while also maintaining overall health of the one or multiple formation teams. For example, the formation manager sub-system 104 may be configured to assess the relevance of the incoming task commands (e.g., determine if the formation management sub-system's 104 corresponding vehicle 502 has been assigned to the task commands), and the formation management sub-system 104 may further be configured to validate the incoming task commands from the formation commander sub-system 102 and if the task commands are deemed valid, the formation management sub-system 104 may be configured to add the validated tasks to a queue of task commands to be assigned.

The formation manager sub-system 104 may also be configured to perform formation health assessment and management functionality in order to maintain a status of the overall state and well-being of the formation team and formation health status with respect to the capabilities and needs of the task commands themselves.

The formation manager sub-system 104 may further be configured to assign the one or more selected vehicles the sequence of the one or more tasks. For example, the formation manager sub-system 104 may be configured to assign the sequence of one or more tasks to the one or more vehicles when the vehicles have completed formation configuration 602 (e.g., all vehicles are synchronized and any requisite preflight operations are complete) and are in the base "out of formation" behavioral state 604. For instance, once formation configuration 602 has been completed, the vehicles may be configured to perform an "out of formation" behavior 604, such that the one or more vehicles may be configured to receive one or more assignments from the formation manager sub-system 104.

The formation manager sub-system 104 may be configured to assign the sequence of one or more tasks to an individual aerial vehicle that is out of formation 602 so that it can perform one or multiple individual out of formation tactics 606. These tactics represent tasks that individual vehicles can perform that do not require direct cooperation or formation flight with other vehicles in the team. For instance, the formation manager sub-system 104 may be configured to assign the individual aerial vehicle an out of formation task such as, but not limited to, pursuing an aerial target, surveilling a stationary point, surveilling a moving point, and the like. When assigned, the formation manager sub-system 104 may be configured to perform the task by transitioning to the behavior state 606 and through any relevant sub-states within the state 606 relevant to the assigned task commands. Once the assigned task is complete (or aborted), the assigned vehicle's formation manager sub-system 104 may be configured to return to the out of formation behavioral state 604.

The formation manager sub-system 104 may be configured to assign the sequence of one or more tasks to a lead aerial vehicle in the formation team, thereby transitioning this vehicle's formation manager to a leader behavioral state 608 from allowable prior states (as shown in FIG. 6). In one instance, the formation manager sub-system 104 may be configured to assign an initial formation building procedure task to a formation team leader (causing a transition to behavioral state 610). The formation building task may include, but is not limited to, single or multi-ship rendezvous with the flight lead, merge team members into an existing formation, or other building formation tasks. In another instance, once a formation has been assembled (consisting of multiple vehicles operating/cooperating in a teaming, formation flight, or collaborative capacity), the formation manager sub-system 104 may be configured to assign an "in formation" tactic to the leader thereby transitioning the leader's formation manager sub-system 104 to the behavior state 612. Leader orchestrated in-formation tactic tasks may include, but are not limited to, reconfigure or change the geometry of the formation, break/depart a member off of the formation team, or performing one of potentially many leader coordinated/leader centric teaming tactics including a team surveillance task, a coordinated attack, a coordinated defense, an escort, a takeoff in formation, a landing in formation, or other like tactics. When assigned, the formation manager sub-system 104 may be configured to perform the task by transitioning to the behavior state 608, the respective sub-states 610, 612, and through any further sub-states of states 608, 610, 612 that are relevant to the assigned task commands. Once the assigned task is complete (or aborted), the assigned vehicles' formation manager sub-systems 104 may be configured to transition to the leader maintain formation behavioral state 614. Further, if the end state of a task results in all vehicles having departed the formation, the leader may be configured to automatically transition from state 614 to state 604.

The formation manager sub-system 104 may further be configured to assign the sequence of one or more tasks to one or more follower aerial vehicles in a formation team, thereby transitioning the vehicle's formation manager to a follower behavioral state 616 from allowable prior states (as shown in FIG. 6). This assignment may be either from the formation manager sub-system 104 assigning and parsing the task commands from the formation commander sub-system 102 directly or via peer to peer coordination with a lead vehicle's formation manager sub-system 104 through the interface 106. In one instance, the formation manager sub-system 104 may be configured to assign an initial formation building procedure task to the follower (causing a transition to behavioral state 618). The formation building task may include, but is not limited to, single or multi-ship rendezvous with a flight lead, merge team members into an existing formation, or other building formation tasks. In another instance, once a formation has been assembled (consisting of multiple vehicles operating/cooperating in a teaming, formation flight, or collaborative capacity), the formation manager sub-system 104 may be configured to assign an "in formation" tactic to a follower aircraft thereby transitioning the follower's formation manager sub-system 104 to the behavior state 620. The follower perspective in-formation tactic tasks may include, but are not limited to, reconfigure or change the geometry of the formation, break/depart a member off of the formation team, or performing one of potentially many tactics as a follower in a leader coordinated/leader centric teaming tactic including a team surveillance task, a coordinated attack, a coordinated defense, an escort, a takeoff in formation, a landing in formation, or other like tactics. When assigned, the formation manager sub-system 104 may be configured to perform the task by transitioning to the behavior state 616, the respective sub-states 618, 620 and through any further sub-states of states 616, 618, 620 that are relevant to the assigned task commands. Once the assigned task is complete (or aborted), the assigned vehicles' formation manager sub-systems 104 may be configured to transition to the follower maintain formation behavior state 622 or the out of formation behavior state 604 depending on the outcome or end state of the assigned task.

The lead aerial vehicles may be further configured to assign tasks to, coordinate with, and monitor the progress of one or more follower aerial vehicles with respect to the sequence of the one or more tasks assigned to the one or more follower aerial vehicles. Similarly, the follower aerial vehicles may be further configured to receive task assignments from, coordinate with, and report progress to the one or more lead aerial vehicles.

The formation manager sub-system 104 may be configured to assign the sequence of one or more tasks to one or more aerial vehicles that are in-formation (in behavior state 622) to perform one or more in-formation side jobs, thereby transitioning the vehicles' formation manager sub-system 104 to behavior state 624. For instance, the formation manager sub-system 104 may be configured to assign an in-formation side job such as, but not limited to, adjusting station offset/spacing relative to a formation lead, performing an aerial refueling maneuver and then returning to the formation, or the like. When assigned, the formation manager sub-system 104 may be configured to perform the tasks by transitioning to the behavior state 624 and through any further sub-states of state 624 that are relevant to the assigned task commands. Once the assigned task is complete (or aborted), the assigned vehicles' formation manager sub-system 104 may be configured to transition to the follower maintain formation state 622 to await further tasking.

The formation manager sub-system 104 may be configured to assign the sequence of one or more tasks to one or more aerial vehicles that are in-formation (either as a follower in state 622 or as a leader in state 614) to perform one or more leaderless cooperative behaviors, thereby transitioning the vehicles' formation manager sub-system 104 to behavior state 626. These tasks may represent tasks that are performed in a decentralized manner without supervision of one or multiple dedicated lead aerial vehicles in the command and control chain. For instance, the formation manager sub-system 104 may be configured to assign a leaderless cooperative behavior such as, but not limited to, swarm flocking, cooperative sensor steering, decentralized cooperative air patrols, reorganizing to optimized formation geometries based on various metrics (e.g., communication health, navigation accuracies, and so on), or the like. When assigned, the formation manager sub-system 104 may be configured to perform the tasks by transitioning to the behavior state 626 (from one of the allowable prior states, depicted in FIG. 6) and through any further sub-states of state 626 that are relevant to the assigned task commands. Once the assigned task is complete (or aborted), the assigned vehicles' formation manager sub-system 104 may be configured to transition from state 626 to other behavior states (as shown in FIG. 6).

The formation manager sub-system 104 may be configured to assign the sequence of one or more tasks to one or more aerial vehicles that are a formation lead (in formation behavior state 614) to perform one or more multi-formation behavior tasks, thereby transitioning the vehicles' formation manager sub-systems 104 to behavior state 628. These tasks may represent tasks that are performed in cooperation with other formation teams through coordination of the flight leads of the formation teams. For instance, the formation manager sub-system 104 may be configured to assign a multi-formation behavior such as, but not limited to, merging to or breaking from a supercluster (multiple formations flying together), absorbing or splitting teams, cooperating on surveillance or reconnaissance tasks, or the like. When assigned, the formation manager sub-system 104 may be configured to perform the tasks by transitioning to the behavior state 628 (from one of the allowable prior states shown in FIG. 6) and through any further sub-states of states 628 that are relevant to the assigned task commands. Once the assigned task is complete (or aborted), the assigned vehicles' formation manager sub-system 104 may be configured to transition from state 628 to other behavior states (as shown in FIG. 6).

It is noted herein, that within the context of FIG. 6, behavior states of out of formation 604, follower maintain formation 622, and leader maintain formation 614 serve as base states from which task commands may be assigned. Within these states the formation manager sub-system 104 may be configured to perform guidance and control actions not specific to a dedicated task but to automatically fly the aircraft as the state implies. For example, follower maintain formation 622 may include following a flight lead at an assigned slot/spacing with respect to that flight lead. By way of another example, leader maintain formation 614 may include leading a formation along a desired trajectory, route, flight path, or similar. By way of another example, out of formation 604 may include flying an individual aircraft along a desired trajectory, route, flight path, or similar not within a multi-ship cooperative context.

The formation manager sub-system 104 may be further configured to automatically execute one or more emergency actions 630 when an emergency event occurs (through detection by one or more of the one or more formation team members, communication from the operator 108, or the like). For example, the formation manager sub-system 104 may be configured to automatically execute one or more leader emergency actions 632 in an attempt to mitigate or otherwise resolve the emergency situation. After the emergency action is resolved, the leader may be configured to transition to the maintain formation state 614 and resume the formation that the leader was participating in prior to the emergency event. If the automatic emergency action causes the leader to leave the formation, the leader may return to the out of formation state 604 and await further tasking.

By way of another example, the formation manager sub-system 104 may be configured to automatically execute one or more follower emergency actions 634 in an attempt to mitigate or otherwise resolve the emergency situation. After the emergency action is resolved, the follower may be configured to transition to the maintain formation state 622 and resume the formation that the follower was participating in prior to the emergency event. If the automatic emergency action causes the follower to leave the formation, the follower mat return to the out of formation state 604 and await further tasking.

It is noted herein that the emergency actions 630, 632, 634 may be entered from any other state in as shown in FIG. 6.

In this regard, the formation manager sub-system 104 may have emergency actions configured to resolve emergency situations encountered in any state within FIG. 6.

Furthermore, the formation manager sub-system 104 may be configured to provide transitions between emergency actions 632 and emergency actions 634 in a bidirectional manner. For example, in performing an emergency action 630 (or 632 or 634), a lead aircraft may be no longer fit for the role and may be downgraded to a follower role (transitioning from 632 to 634) and similarly, a follower aircraft may be elevated to a lead role (transitioning from 634 to 632).

The emergency event may include, but is not required to include, loss of communication between team members, an aerial vehicle being disabled or shot down, or the like.

Although FIG. 6 and the above discussion describe specific formation behaviors and classifications, it is noted herein that the system 100 may be configured to perform any formation behavior and classification. Therefore, the above should not be construed as limiting the scope of the present disclosure.

Figure 7:
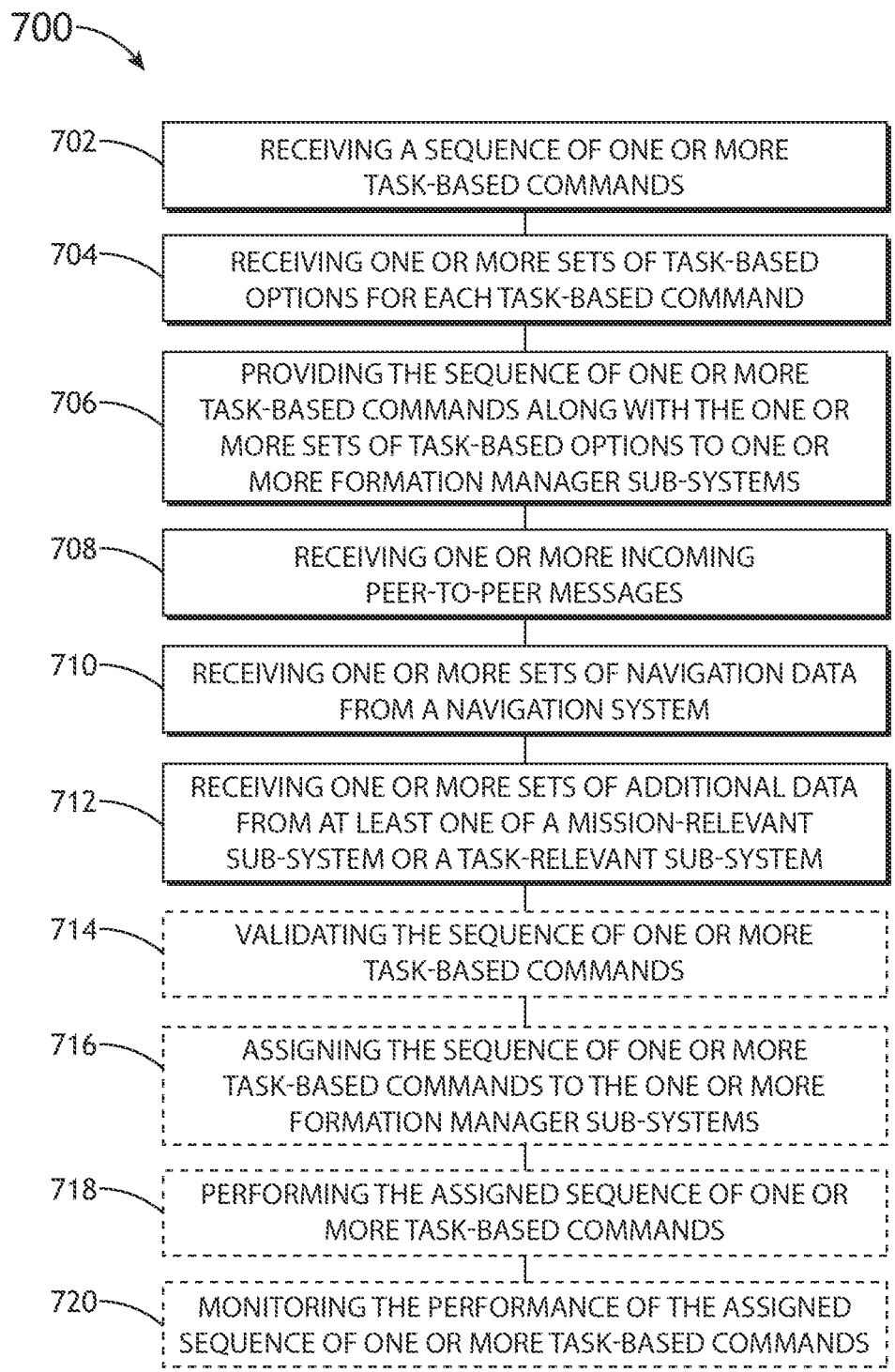
FIG. 7 illustrates a flow diagram depicting a method or process for the formation management and guidance system, in accordance with one or more embodiments of the disclosure.
Figure 7:
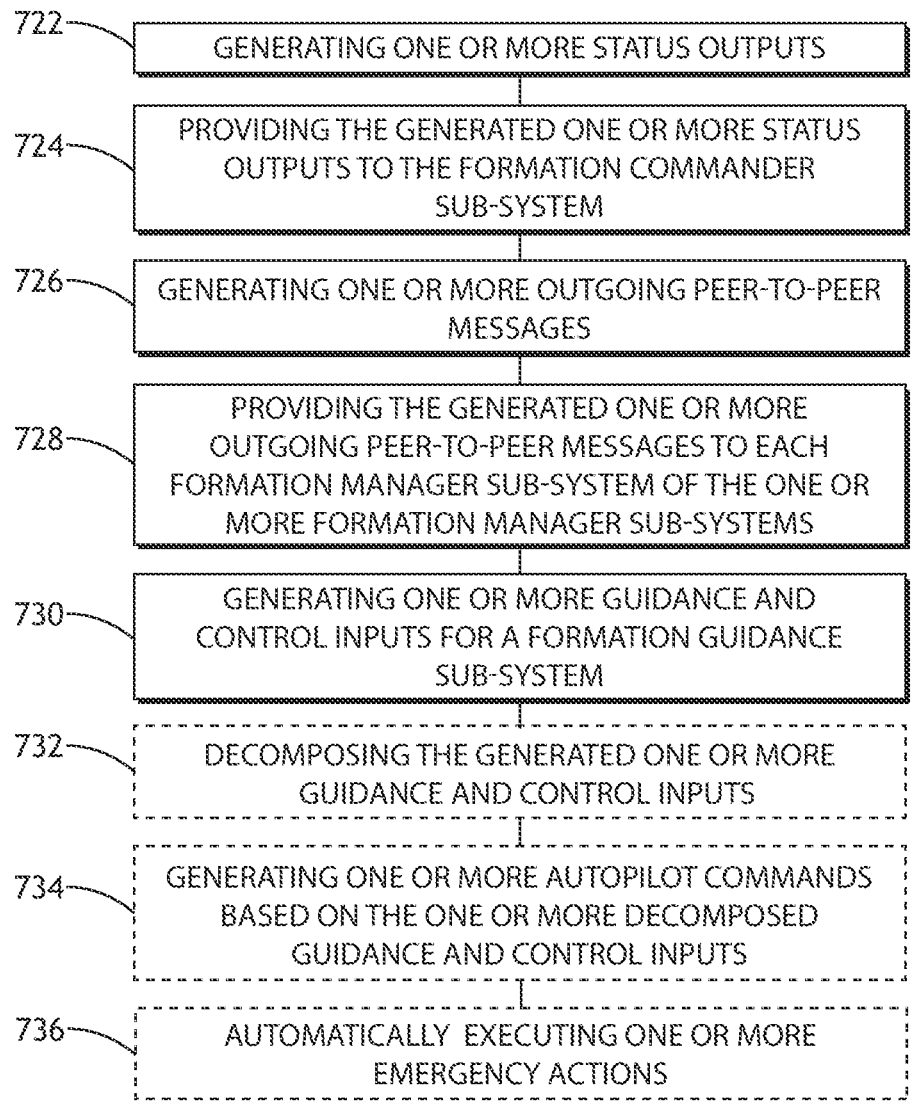

FIG. 7 illustrates a flow diagram depicting a method or process 700 for the formation management and guidance system 100, in accordance with one or more embodiments of the disclosure.

In step 702, a sequence of one or more task-based commands may be received from an operator. For example, the operator 108 may be configured to use one or more task-based selectable buttons 110 on the task-based interface 106 to select a sequence of one or more task-based commands for the one or more vehicles to perform. Prior to selecting a sequence of one or more task-based commands, the operator 108 may be configured to make a selection of one or more teams of aerial vehicles to assign a sequence of one or more tasks to using one or more team selectable buttons 112. Then, the operator 108 may be configured to make a selection of one or more members of the selected teams of aerial vehicles to perform the sequence of one or more tasks using one or member selectable buttons 114.

The one or more sets of selectable buttons may be dynamically adjusted based on received sets of formation roster data. For example, a set of formation roster data may be received from each vehicle in the team of aerial vehicles. The set of formation roster data may include information about the one or more teams, the one or more members of the team, the state of formation for the one or more teams or members, and the like. In this regard, the one or more sets of selectable buttons may be dynamically adjusted based on the data, such that the available selectable buttons reflects the data received. For instance, if team A only includes three members, then the interface 106 will be configured to be adjusted to show only three member selectable buttons.

In step 704, one or more sets of task-based options may be received. For example, the one or more sets of task-based options may be received using one or more selectable buttons of the interface 106. For instance, the options window 300 (as shown in FIG. 3) may be configured to allow an operator 108 (e.g., formation commander) to specify one or more options for the selected task selected with the selectable buttons 110 (step 706).

In step 706, the sequence of the one or more task-based commands along with the one or more sets of task-based options may be provided to the formation manager sub-system. For example, the formation manager sub-system 104 may be configured to receive the one or more task-based commands and options over a universal network.

In step 708, one or more incoming peer-to-peer messages may be received. For example, the formation manager sub-system 104 may be configured to receive one or more incoming peer-to-peer messages 103 over a local network from the one or more vehicles in the one or more teams of vehicles.

In step 710, one or more sets of navigation data may be received from a navigation system. For example, the formation manager sub-system 104 may be configured to receive the navigation data from the navigation system.

In step 712, one or more sets of additional data may be received. For example, the formation manager sub-system 104 may be configured to receive one or more sets of mission-relevant data from a mission-relevant sub-system. By way of another example, the formation manager sub-system 104 may be configured to receive one or more sets of task-relevant data from a task-relevant sub-system.

In an optional step 714, the sequence of the one or more task-based commands may be validated. For example, the formation manager sub-system 104 may be configured to validate the received one or more task-based commands from the formation commander sub-system 109.

In an optional step 716, the sequence of one or more task-based commands may be assigned to the formation manager sub-system. For example, the formation commander sub-system 102 may be configured to assign the validated task-based commands to the formation manager sub-system 104 onboard each vehicle in the team of vehicles. For instance, the formation manager sub-system 104 may be configured to assign the sequence of one or more tasks to the one or more vehicles when the vehicles have completed formation configuration 602 (e.g., all vehicles are synchronized) and are in the out-of-formation behavior state 604. The formation manager sub-system 104 may be configured to assign the sequence of one or more tasks one or more individual aerial vehicles that are not currently flying in a formation/teaming arrangement 606. Further, the formation manager sub-system 104 may be configured to assign the sequence of one or more teaming leader-follower tasks to a lead aerial vehicle 608. Once the leader performs the assigned tasks or the task is aborted, the leader may be configured to maintain the formation in a leader role 614. The lead aerial vehicle may then be configured to assign the sequence of one or more tasks to one or more follower aerial vehicles 616.

Once the task is completed or aborted by the one or more follower vehicles, the one or more follower vehicles may be configured to maintain the formation in a follower role 622 or be out of formation 604 depending on the outcome/end state of the task. When the one or more follower vehicles are in this maintain formation state 604, the formation manager sub-system 104 may be configured to assign the sequence of one or more tasks to an individual aerial vehicle in formation such that the individual vehicle in formation may be configured to perform one or more in-formation side jobs 624. Alternatively, once the follower vehicles are in maintain formation 622, the formation manager sub-system 104 may be configured to assign the sequence of one or more leaderless (decentralized) cooperative tasks to one or more of the followers 626 thereby assigning them one or more tasks where vehicles can be configured to make one or more decisions on their own (without supervision of a leader aerial vehicle).

Once the leader vehicles are in maintain formation 614, the formation manager sub-system 104 may be configured to assign the sequence of the one or more leaderless (decentralized) cooperative tasks to one or more leader vehicles 626. Once the leader vehicles are in maintain formation 614, the formation manager sub-system 104 may be configured to assign the sequence of the one or more multi-formation tasks to one or more leader vehicles 628. Once the leader is in maintain formation 614, the formation manager sub-system 104 may be configured to automatically transition to an out of formation state 604 if all follower vehicles have departed the formation.

In an optional step 718, the assigned sequence of the one or more task-based commands may be performed by the one or more vehicles.

In an optional step 720, the performance of the assigned sequence of the one or more task-based commands may be monitored. For example, the formation manager sub-system 104 may be configured to monitor the progress of the assigned task (e.g., whether it was completed, was aborted, had failed, is in progress, or the like) via one or more incoming messages 103.

In step 722, one or more status outputs may be generated based on at least one of the task-based commands, task-based options, incoming peer-to-peer messages, navigation data, or the additional data and provided to the formation commander sub-system 102 (step 724). For example, the formation manager sub-system 104 may be configured to generate the one or more status outputs and provide the one or more generated status outputs to the formation commander sub-system 102.

In step 726, one or more outgoing peer-to-peer messages may be generated based on at least one of the task-based commands, task-based options, incoming peer-to-peer messages, navigation data, or the additional data and provided to the one or more vehicles (step 728). For example, the formation manager sub-system 104 may be configured to generate the one or more outgoing messages 103 and provide the messages 103 to the formation manager sub-system aboard each vehicle in the team of vehicles.

In step 730, one or more guidance and control inputs may be generated for a formation guidance sub-system. For example, the formation manager sub-system 104 may be configured to generate one or more guidance and control inputs for a formation guidance sub-system 109 based on at least one of the task-based commands, task-based options, incoming peer-to-peer messages, navigation data, or the additional data. The inputs may include, but are not limited to, trajectories to track, targets to pursue, cooperative aircraft to follow, and the like.

In an optional step 732, the one or more guidance and control inputs may be decomposed. For example, the formation guidance sub-system 109 may be configured to decompose the one or more guidance and control inputs generated in step 730.

In an optional step 734, one or more autopilot commands may be generated based on the one or more decomposed guidance and control inputs. For example, the formation guidance sub-system 109 may be configured to generate one or more autopilot commands. The one or more autopilot commands may include, but are not limited to, airspeed, band, vertical speed, acceleration vectors, and the like.

In an optional step 736, one or more emergency actions may be executed. For example, when an emergency event trigger is detected, raised or received, the one or more aerial vehicles may be configured to perform one or more emergency actions. The emergency event may include, but is not required to include, loss of communication between team members, an aerial vehicle being shot down, or the like.

As discussed throughout the present disclosure, the formation manager sub-systems 104 on the vehicles 502 may be configured to receive sequences of task-based commands, assignments, and options as specified by an operator 108 through an interface 106. When received, the formation manager sub-systems 104 operating on each of the vehicles 502, disposition (assign, validate, or the like) the task commands accordingly to the associated, selected, and available vehicles 502, which serve to transition their formation manager sub-systems 104 through a variety of behavior states, as shown in FIG. 6. Once assigned, the formation manager sub-systems 104 may be configured to perform the assigned tasks accordingly coordinating amongst teamed vehicles through locally networked groups (as shown in FIG. 5) through the peer-to-peer interfaces 103. Further, the formation manager sub-systems 104 may be configured to routinely provide status outputs about the state/health of the vehicles themselves, their state/performance with respect to the one or more assigned tasks, and the state/health of the one or more formation teams. Tasks may be concluded in a variety of ways including successful completion, failing to initiate the task (assigned vehicles incapable, busy, or otherwise unable to perform the commanded task), aborting/failing to complete the task, and so on. Additional task commands may be received through the task-based interface 106 by the formation manager sub-system 104 dynamically in time and further task dispositions, actions, and behavior transitions (as shown in FIG. 6) will evolve accordingly. While performing a task, the formation manager sub-systems 104 may be configured to plan trajectories for the vehicles 502 to execute and generate guidance or autopilot commands to maneuver the vehicles in accordance with the nature of the task being performed. These guidance commands may be configured to maneuver the vehicle in an absolute sense (relative to conventional geometry like latitudes, longitudes, and the like) or in a relative sense (relative to offsets between the maneuvering ownship vehicle and one or more maneuvering cooperating vehicles in the one or more formation teams). Regardless, these guidance commands may be provided to further automated flight components including a formation guidance sub-system 109 that may host additional guidance and control functionality in order to decompose output commands from the formation manager sub-system 104 into commands that may directly interface with an autopilot system (e.g., flight control computer, flight director, fly-by-wire system, and the like.). Further, the formation manager sub-system 104 may be configured to perform a variety of other functions related to task-based multi-vehicle coordination including, but not limited to, managing peer-to-peer communications (e.g., monitoring for alerts/issues, responding to commands from lead aircraft higher in the chain of command, and so on), monitoring individual vehicle health and formation team health (e.g., ownship and teammate health checks, multi-vehicle redundancy management, collision alert detection, lost link/loss of communications assessment, and other similar formation integrity assessments), and so on.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A system for automated formation flight, comprising:
a formation commander sub-system including a task-based interface configured to receive a sequence of one or more task-based commands along with one or more sets of task-based options for each of the one or more task-based commands from an operator using one or more task-based selectable buttons of the task-based interface; and
an on-board formation manger sub-system communicatively coupled to the formation commander sub-system, the on-board formation manager sub-system including one or more processors aboard each vehicle of one or more vehicles within one or more teams, the formation manager sub-system configured to:
  receive the sequence of one or more task-based commands along with the one or more sets of task-based options from the formation commander sub-system;
  receive one or more incoming peer-to-peer messages from each vehicle of the one or more vehicles within the one or more teams, the one or more peer-to-peer messages received over a local network between the one or more vehicles within the one or more teams;
  parse and decompose peer-to-peer data within the received one or more incoming peer-to-peer messages;
  perform one or more functions based on the decomposed peer-to-peer data within the received one or more incoming peer-to-peer messages, the one or more functions including at least one of formation health management functionality, generating alerts, or performing task specific monitoring and behaviors;
  receive one or more sets of navigation data from a navigation system, the received one or more sets of navigation data including a set of ownship navigation data;
  receive one or more sets of additional data from at least one of one or more mission-relevant or one or more task-relevant sub-systems;
  generate one or more status outputs based on at least one of the one or more task-based commands, the one or more sets of task-based options, the one or more incoming peer-to-peer messages, the one or more sets of navigation data, or the one or more sets of additional data, the generated one or more status outputs including at least one of a task status, a vehicle health status, or a communication status;
  provide the generated one or more status outputs to the formation commander sub-system;
  generate one or more outgoing peer-to-peer messages based on at least one of the one or more task-based commands, the one or more sets of task-based options, the one or more incoming peer-to-peer messages, the one or more sets of navigation data, or the one or more sets of additional data;

provide the generated one or more outgoing peer-to-peer messages to each vehicle of the one or more vehicles within the one or more teams; and generate one or more guidance and control inputs for an on-board formation guidance sub-system based on at least one of the one or more task-based commands, the one or more sets of task-based options, the one or more incoming peer-to-peer messages, the one or more sets of navigation data, or the one or more sets of additional data, the on-board formation guidance sub-system including one or more processors aboard each vehicle of the one or more vehicles within the one or more teams;

the formation commander sub-system configured to:

dynamically adjust the task-based interface based on the provided one or more status outputs from the formation manager sub-system;

decompose the generated one or more guidance and control inputs; and generate one or more autopilot commands based on the one or more decomposed guidance and control inputs.

2. The system of claim 1, wherein the generated one or more guidance and control inputs include one or more trajectories for the one or more vehicles to follow.

3. The system of claim 1, wherein the generated one or more guidance and control inputs include one or more offsets relative to one or more targets for the one or more vehicles to maintain.

4. The system of claim 1, wherein the formation commander sub-system is further configured to:

display the generated one or more status outputs provided by the formation manager sub-systems on the task-based interface.

5. The system of claim 1, wherein the formation manager sub-system is further configured to:

receive a set of formation roster data indicating team composition and characteristics of the one or more teams;

generate one or more status outputs based on at least one of the one or more task-based commands, the one or more sets of task-based options, the one or more incoming peer-to-peer messages, the one or more sets of navigation data, or the one or more sets of additional data, or the set of formation roster data;

generate one or more outgoing peer-to-peer messages based on at least one of the one or more task-based commands, the one or more sets of task-based options, the one or more incoming peer-to-peer messages, the one or more sets of navigation data, or the one or more sets of additional data, or the set of formation roster data; and generate one or more guidance and control inputs for a formation guidance sub-system based on at least one of the one or more task-based commands, the one or more sets of task-based options, the one or more incoming peer-to-peer messages, the one or more sets of navigation data, or the one or more sets of additional data, or the set of formation roster data.

6. The system of claim 5, wherein the formation manager sub-system is further configured to:

generate a set of modified formation roster data;

provide the set of modified formation roster data to each vehicle of the one or more vehicles within the one or more teams, the set of modified roster data provided as one or more outgoing peer-to-peer messages;

receive the set of modified formation roster data as one or more incoming peer-to-peer messages;

update the set of formation roster data with the set of modified formation roster data; and provide the set of modified formation roster data to the formation commander sub-system, the set of modified formation data provided as one or more status outputs.

7. The system of claim 1, wherein the formation manager sub-system is further configured to:

automatically execute one or more emergency actions when an emergency event occurs.

8. The system of claim 1, wherein the at least one of the one or more mission-relevant sub-systems or the one or more task-relevant sub-systems include at least one of:

one or more payload sub-systems, one or more radios, one or more tactical sensors, or one or more cameras.

9. The system of claim 1, wherein the operator includes at least one of:

a human, executing software logic, or an artificially intelligent agent (AI).

10. The system of claim 1, wherein the one or more task-based selectable buttons are organized into one or more categorized groups including at least one of:

Individual out-of-formation tasks, Leader-Follower formation tasks, Leaderless cooperative tasks, In-formation side tasks, or Multi-formation coordinating tasks.

11. A method for automation formation flight, comprising:

receiving a sequence of one or more task-based commands from an operator using one or more task-based selectable buttons of a task-based interface of a formation commander sub-system;

receiving one or more sets of task-based options for each task-based command of the one or more task-based commands using one or more task-based options selectable buttons of the task-based interface of the formation commander sub-system;

providing the sequence of one or more task-based commands along with the one or more sets of task-based options to one or more on-board formation manager sub-systems, each on-board formation manager sub-system of the one or more on-board formation manager sub-systems including one or more processors aboard a vehicle in one or more teams of one or more vehicles;

receiving one or more incoming peer-to-peer messages from each formation manager sub-system of the one or more formation manager sub-systems employed on a vehicle in the one or more teams of one or more vehicles, the one or more peer-to-peer messages received over a local network between the one or more vehicles within the one or more teams;

parsing and decomposing peer-to-peer data within the received one or more incoming peer-to-peer messages;

performing one or more functions based on the decomposed peer-to-peer data within the received one or more incoming peer-to-peer messages, the one or more functions including at least one of formation health management functionality, generating alerts, or performing task specific monitoring and behaviors;

receiving one or more sets of navigation data from a navigation system, the received one or more sets of navigation data including a set of ownship navigation data;

receiving one or more sets of additional data from at least one of a mission-relevant sub-system or a task-relevant sub-system;

generating one or more status outputs based on at least one of the one or more task-based commands, the one or more sets of task-based options, the received one or more incoming peer-to-peer messages, the one or more sets of navigation data, or the received one or more sets of additional data, the generated one or more status outputs including at least one of a task status, a vehicle health status, or a communication status;

providing the generated one or more status outputs to the formation commander sub-system;

generating one or more outgoing peer-to-peer messages based on at least one of the one or more task-based commands, the one or more sets of task-based options, the one or more incoming peer-to-peer messages, the one or more sets of navigation data, or the one or more sets of additional data;

providing the generated one or more outgoing peer-to-peer messages to each formation manager sub-system of the one or more formation manager sub-systems employed on a vehicle of the one or more teams of the one or more vehicles;

generating one or more guidance and control inputs for an on-board formation guidance sub-system based on at least one of the one or more task-based commands, the one or more sets of task-based options, the one or more incoming peer-to-peer messages, the one or more sets of navigation data, or the one or more sets of additional data, the on-board formation guidance sub-system including one or more processors aboard each vehicle of the one or more vehicles within the one or more teams;

dynamically adjusting the task-based interface based on the provided one or more status outputs from the formation manager sub-system;

decomposing the generated one or more guidance and control inputs; and generating one or more autopilot commands based on the one or more decomposed guidance and control inputs.

12. The method of claim 11, further comprising:

validating the sequence of one or more task-based commands;

assigning the sequence of one or more task-based commands to the one or more formation manager sub-systems;

performing the assigned sequence of one or more task-based commands; and monitoring the performance of the assigned sequence of one or more task-based commands through the one or more incoming peer-to-peer messages and the one or more outgoing peer-to-peer messages.

13. The method of claim 11, further comprising:

automatically executing one or more emergency actions when an emergency event occurs.

* * * * *